June 30, 1931.  H. FRÖHLICH ET AL  1,812,332
INDUCTION METER
Filed April 8, 1930

H. Fröhlich and P. Hauch
INVENTOR
BY John D. Morgan
ATTORNEY

Patented June 30, 1931

1,812,332

UNITED STATES PATENT OFFICE

HANS FRÖHLICH AND THEODOR HAUSCH, OF ZUG, SWITZERLAND, ASSIGNORS TO LANDIS & GYR, A. G., OF ZUG, SWITZERLAND, A CORPORATION OF SWITZERLAND

INDUCTION METER

Application filed April 8, 1930, Serial No. 442,528, and in Switzerland April 11, 1929.

The present invention relates to electricity meters and more particularly to means for compensating for the temperature errors of induction meters.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:—

Figure 1:
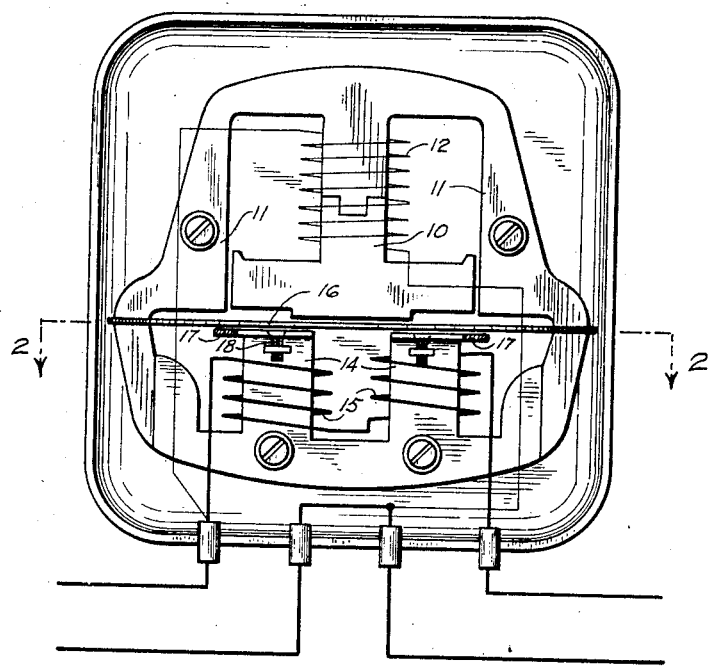
Figure 1 is a vertical section, partly diagrammatic, of an induction meter embodying the improvements of the present invention, and taken on the line 1—1 of Fig. 2.
Figure 2:
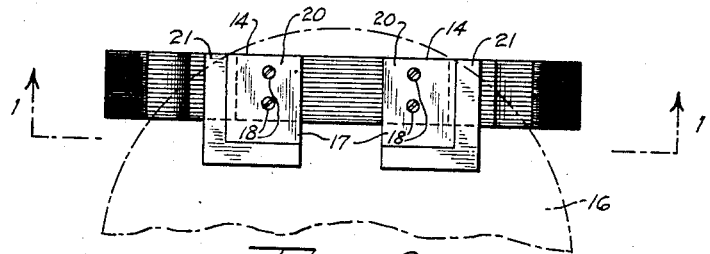
Figure 2 is a horizontal section taken on the line 2—2 of Figure 1.

The present invention has for its object the elimination or compensation of the temperature errors in induction meters and more particularly to the compensation of temperature errors at widely varying power factors.

In general, induction meters have an appreciable temperature error which is different at different power factors and to overcome this, it has been proposed to arrange in the magnetic circuit of the driving flux, a material, the magnetic properties of which are dependent on the temperature, but such an arrangement permits compensation of the temperature error at only a single power factor.

It has also been proposed to enlarge the poles of the driving magnets by securing sheet metal plates to the ends of the pole pieces to increase the driving fluxes but at the same time cause the phase angle to be reduced, thereby causing an error in the registration of the meter.

The present invention, in its preferred embodiment, increases the driving flux of the magnets by the use of sheet metal polar extensions made of sheet iron and a thermally sensitive alloy, the permeability of which decreases with rising temperature. With induction meters, when the power factor is 1, there is generally a positive temperature error, while at a power factor of 0.5, the temperature error is considerably less than that at a power factor of 1, due to the increase in resistance of the voltage windings as the temperature increases. By using the thermally sensitive alloy to form a portion of the pole enlarging plates, and thereby causing a decrease in the driving flux as the temperature rises, the positive temperature error at a power factor of 1 can be eliminated. Furthermore, this same reduction of the action of the sheet metal extensions causes a relative increase in the phase angle between the driving fluxes compensating for the increase in the resistance of the voltage coil, which would produce a relative reduction of the phase angle.

Referring now in detail to the illustrative embodiment shown in the accompanying drawings, the invention is shown as applied to the compensation of the temperature errors in a conventional type of induction meter. In this embodiment, the induction meter comprises a voltage magnet, a current magnet and a metering disc to be driven by the rotating field produced by the magnets, the rotation of the disc being proportional to the energy consumed in the metered circuit.

The voltage magnet comprises the voltage core, having a central pole piece 10 surrounded by the voltage coil 12, and the outer limbs or pole pieces 11. The current magnet comprises the current core having pole pieces 14 which are surrounded by current coils 15. The magnets are spaced a slight distance from each other, as usual, and between their pole pieces is rotatably mounted the usual metering disc 16 which may be connected with suitable registering mechanism.

For increasing the driving flux, the pole pieces of the current magnets are preferably provided with pole enlarging plates 17, which may be secured to the upper faces of the pole pieces 14 by suitable means, such as screws 18, and these plates are preferably considerably larger in area than the face of the pole pieces.

In accordance with the present invention, and for the purpose of eliminating or compensating for the temperature error of the meter at widely varying power factors, the pole enlarging plates are preferably formed in part of iron and in part of a copper-nickel alloy, the permeability of which decreases with rising temperature, and the amounts of each employed are so proportioned that the temperature error of the meter is reduced and substantially eliminated. As embodied, the pole enlarging plates 17 preferably comprise an iron plate 20 only slightly larger than the face of the pole pieces 14 of the current core, and these iron plates are provided with a border 21 of the temperature sensitive alloy partially surrounding the iron plate 20 and rigidly secured thereto. As shown in the accompanying drawings, two of the edges of the iron plate 20 are preferably registered with the edges of the pole pieces 14, so that the overlap of the iron plate is all on one side of the pole piece.

Figure 3:
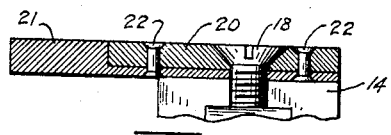
Figure 3 is a detailed vertical section of one modification of the present invention.
Figure 5:
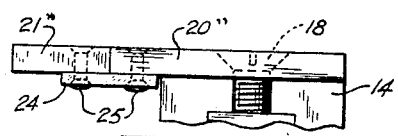
Figures 4 and 5 are similar views showing other modifications of the present invention.
Figure 4:
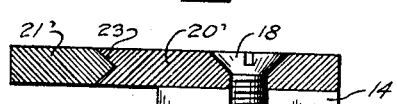

Figures 3 to 5 of the drawings illustrate modified forms of the pole enlarging plates, and as shown in Figure 3, the iron plate 20 is inlaid in a correspondingly shaped recess in a larger plate 21 formed of the thermally sensitive alloy, the iron plate 20 being firmly secured thereto, as by rivets 22.

In Figure 4 of the drawings, the iron plate 20' is provided with a dovetail joint 23 by which the surrounding border or plate 21' of thermally sensitive alloy is secured to the iron plate.

In Figure 5 of the drawings, the iron plate 20" and the border 21" of thermally sensitive alloy are secured together by means of small strips 24 which are fastened to the plates 20" and 21" by means of rivets 25.

In operation, as the temperature at which the meter is operating rises, the alloy plates 21 become more and more non-magnetic thereby effectively reducing the size of the pole enlarging plates, consequently preventing an increase in the torque of the meter and also preventing a reduction of the phase angle between the driving fluxes.

By suitably dimensioning the width of the alloy plates, and by varying the chemical composition of the alloy, it is possible to compensate for the temperature error of the meter over an extremely large range of temperatures and between power factors of 0.5 and 1.0 with a satisfactory degree of accuracy.

The invention in its broader aspects is not limited to the specific mechanisms shown and described but departures may be made therefrom within the scope of the accompanying claims without departing from the principles of the invention and without sacrificing its chief advantages.

What we claim is:—

1. In an induction meter having voltage and current coils and cores, a pole enlarging means attached to one of the cores and formed partly of iron and partly of an alloy, the permeability of which decreases with increasing temperature.

2. In an induction meter having voltage and current coils and cores, pole enlarging means comprising a plate attached to one of the cores and formed partly of iron and partly of a thermally sensitive alloy.

3. In an induction meter having voltage and current coils and cores, a plate overlapping the pole pieces of one of the cores and supported thereby comprising iron and a thermally sensitive copper-nickel alloy.

4. In an induction meter having a current magnet, a voltage magnet and a metering disc driven thereby, pole enlarging plates attached to the pole pieces of one of said magnets and formed in part of iron and in part of an alloy the permeability of which decreases with rising temperature, the proportion of the iron and alloy being such that temperature errors are substantially eliminated at widely different power factors.

5. A pole enlarging plate comprising an iron plate having a border of an alloy the permeability of which decreases with rising temperature.

6. A pole enlarging plate to be attached to the pole piece of an induction meter and comprising an iron plate partially surrounded by a border of a nickel-copper alloy which is thermally sensitive.

In testimony whereof, we have signed our names to this specification.

HANS FRÖHLICH.
THEODOR HAUSCH.